United States Patent [19]
Lal et al.

[11] Patent Number: 5,166,006
[45] Date of Patent: Nov. 24, 1992

[54] TEXTURED THIN-FILM SUBSTRATE AND METHOD

[75] Inventors: Brij B. Lal, San Jose; Atef H. Eltoukhy, Saratoga, both of Calif.

[73] Assignee: HMT Technology Corporation, Fremont, Calif.

[21] Appl. No.: 709,383

[22] Filed: Jun. 3, 1991

[51] Int. Cl.[5] .......................... B44C 1/22; C23F 1/00; G11B 5/74; G11B 3/70
[52] U.S. Cl. ...................................... 428/612; 29/603; 156/651; 156/656; 156/659.1; 156/664; 252/79.2; 360/135; 369/276; 427/130; 428/687; 428/900
[58] Field of Search ...................... 156/651, 656, 659.1, 156/664; 252/79.2; 428/612, 687, 141, 170, 220, 900; 360/131, 135; 427/128, 130, 131; 29/603; 369/275.4, 282, 276

[56] References Cited

U.S. PATENT DOCUMENTS 4,726,006  2/1988  Benne et al. .................. 369/280

*Primary Examiner*—William A. Powell
*Attorney, Agent, or Firm*—Peter J. Dehlinger

[57] ABSTRACT

A method of forming an isotropic texture having a selected summit density and surface roughness in a selected inner-diameter annular zone of a thin-film medium substrate having a polished metal coating on the substrate. The zone is selectively exposed to a chemical etchant, under etchant strength, temperature, and exposure time, until the selected summit density and roughness are achieved. In a preferred embodiment, the etching conditions are selected to produce a summit density between about 500–20,000/mm$^2$, and an arithmetic mean roughness value between about 20–70 Å in the inner zone, and a substantially reduced roughness value in an annular, isotropically textured outer-diameter zone of the coating. A thin-film medium formed on the substrate is suitable for near-contact recording.

17 Claims, 8 Drawing Sheets

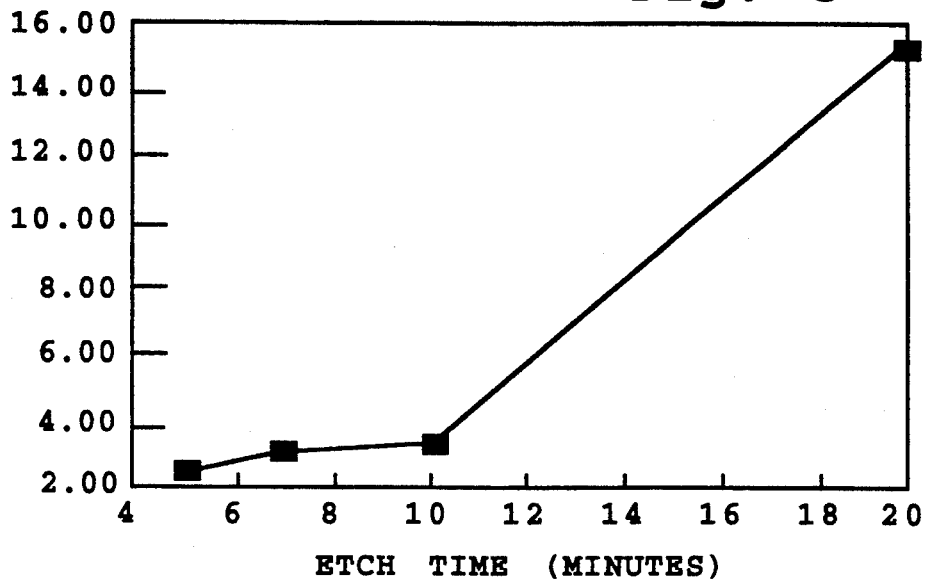
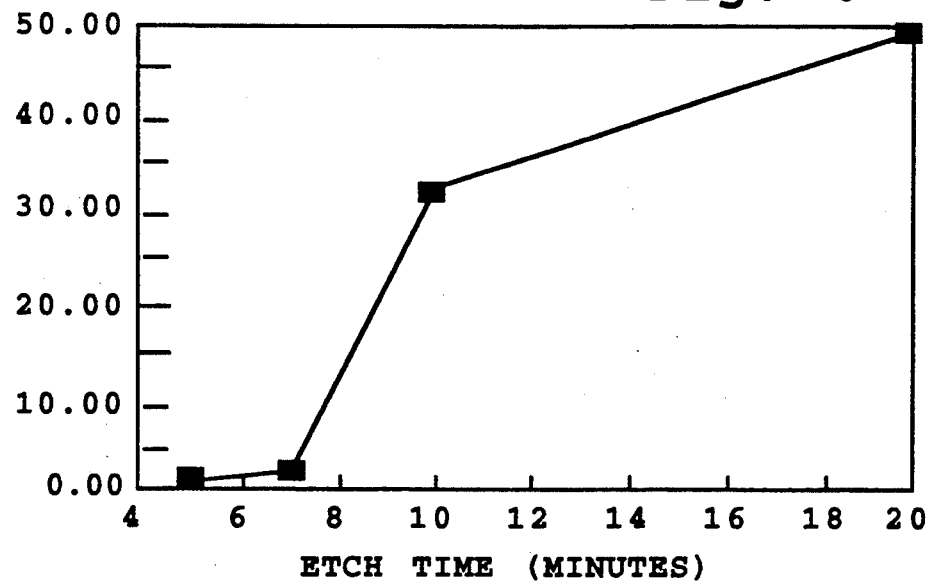

TEXTURED THIN-FILM SUBSTRATE AND METHOD

FIELD OF THE INVENTION

The present invention is directed to a method of producing an isotropic texture in a nickel-coated substrate for the thin-film medium, and the textured substrate produced by the method.

BACKGROUND OF THE INVENTION

Over the past several years, a significant increase in recording density in thin-film media has been achieved, and there is a continuing effort to increase recording density further.

A number of magnetic properties in a thin-film media are important to achieving high recording density, including high coercivity and remanence, and low flying height. The latter property is important because as the read/write head is moved closer to the disk, there is less overlap of voltage signals in adjacent magnetic domains in the disc, thus permitting recording density to be increased.

Heretofore, disks having high coercivity and remanence characteristics have been prepared by sputtering a thin magnetic film on a metal substrate, typically an aluminum substrate. Prior to sputtering, the substrate is plated with a selected alloy plating, such as a nickel/phosphorus coating, to achieve a requisite surface hardness, and the plated substrate is polished to remove surface irregularities. Before applying the sputtered layers, the surface of the substrate is textured to create a roughened surface characterized by submicron surface irregularities. The roughened surface reduces stiction between the disk and head by reducing surface contact between the two.

There are several surface-texture properties which may affect stiction and disc wear relating to start stop-cycles. One is surface roughness, which provides a measure of peak-to-valley distances in a plane. Roughness is commonly expressed as arithmetic average value of absolute distances above and below a reference plane along a line. In general, the stiction coefficient tends to drop significantly at a average mean roughness value above about 20-50 Å.

Another surface-texture property is summit density, which provides a measures of peak density in a given surface area. A higher summit density may lower stiction by lowering the total surface contact between peaks in a textured surface and the surface of the read-write head.

The degree of isotropy of the texture in the plane of the surface can also influence stiction coefficient. In a substantially isotropic texture, both the roughness and summit density features of a surface are relatively uniform in any direction of the plane, and generally higher summit densities can be achieved. An isotropic texture also reduces any position-dependent variation in stiction, which can lead to increased wear in the disc surface.

Heretofore, in metal substrates coated with a metal plating, such as a polished nickel-phosphorus coating, mechanical abrading methods have been used to achieve a desired surface texture. In this method, the substrate is rotated in a abrasive-particle slurry, while a pad is pressed against the substrate surface, or portion thereof, with a selected abrading force. To increase surface roughness it is necessary to apply a greater pad pressure against the rotating disc, or to employ larger-size abrasive particles, or a combination of both. However, applying a greater abrading force increases the possibility of damaging the plated surface mechanically, which can lead to disc failure. The size of abrasive particles which can be employed is also limited by the reduction in peak density which occurs with larger-size particles. Peak density is also limited, in mechanical abrasion, by the highly anistropic texture, which favors high peak density in a radial direction, but relatively low peak density in an angular direction.

SUMMARY OF THE INVENTION

It is therefore a general object of the invention to provide a method of texturing a plated metal substrate to produce an isotropic texture with a selected roughness and peak density properties in selected annular zones of the substrate.

It is another object of the invention to provide a substrate and thin-film medium produced by the method.

The invention includes, in one aspect, a method of texturing a polished, metal, annular-surface coating on a thin-film medium substrate, to produce a substantially isotropic texture with a selected roughness and summit density in a selected annular region of the coating. The selected annular region is exposed to a chemical etchant effective to etch the surface coating, under etching conditions effective to produce the desired roughness and summit density properties.

In a preferred embodiment, the coating contains between 86 and 93 atom percent nickel and 7 and 14 atom percent phosphorus. One preferred etchant contains 1-10 M nitric acid, 0.1-2 M phosphoric acid, and 0.1-1 M $H_2O_2$. The zone of greatest exposure is the annular inner-diameter region corresponding to the landing zone in a thin-film medium.

The method is preferably effective to produce an isotropic summit density of between 500-20,000/m², and an arithmetic mean roughness value between about 20-70 Å.

In another aspect the invention includes a thin-film magnetic medium having an annular, disc-like support, and an annular metal coating formed on the support. The coating is characterized by a substantially isotropic texture with a selected roughness and summit density in a selected annular zone of the coating, corresponding to the landing zone of a read-write head in a thin-film medium, and a smoother texture in a region of the disc corresponding to the recording zone of a thin-film medium.

In a preferred embodiment, the texture in the selected zone has a summit density between about 500-20,0000/mm² and an arithmetic mean roughness between about 20-70 Å. A thin-film medium formed on the substrate further includes a chromium underlayer, a magnetic thin-film layer, and a carbon overcoat, forming a thin film medium with a surface roughness less than about 0.5µ inch.

These and other objects and features of the invention will become more fully apparent when the following detailed description of the invention is read in conjunction with the accompanying drawings.

BRIEF DESCRIPTION OF THE DRAWINGS

FIG. 5 is a plot of surface roughness, measured as arithmetic mean roughness, as a function of etching time, determined from the depth profiles from FIGS. 4A-4D;

FIG. 6 is a plot of summit density as a function of etching time, determined from the depth profiles from FIGS. 4A-4D;

DETAILED DESCRIPTION OF THE INVENTION

A. Textured Substrate

Figure 1:
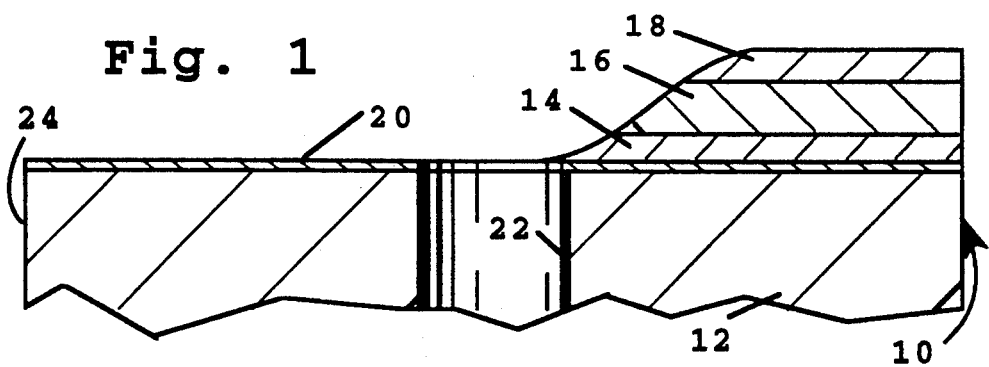
FIG. 1 shows a thin-film medium having a textured substrate formed in accordance with the present invention.

FIG. 1 shows, in exaggerated vertical scale, a cross-sectional view of one side of a two-sided thin-film medium 10 having a textured substrate surface 12 prepared in accordance with the invention. Formed in successive layers over the substrate are: an underlayer 14, a magnetic thin-film layer 16, and a carbon overcoat 18, as will be described in Section C below.

The substrate is a rigid, preferably aluminum disc-like substrate having a metal outer coating 20 formed on one or both substrate sides. Two standard-size substrates have outer diameters of 130 or 95 mm, with corresponding inner diameters of 40 and 25 mm, respectively. The inner and outer edges of the disc which define these diameters are indicated at 22, 24, respectively, in FIGS. 1 and 2. The coating is preferably a nickel-phosphorous coating containing between 86-93 atom percent nickel and 7-14 atom percent phosphorous, and having a thickness between about 300-600 micro-inches. The coating may be formed of other metal or metal-alloy materials, such as aluminum/magnesium/copper, aluminum/magnesium, alumina, titanium or titanium steel.

According to an important aspect of the invention, the coating has a substantially isotropic texture with a selected roughness and summit density in an annular region of the substrate corresponding to the landing zone of a read-write head in a thin-film medium, and a smoother, preferably isotropic texture in one or more annular regions corresponding to the recording zone of the medium.

Figure 2B:
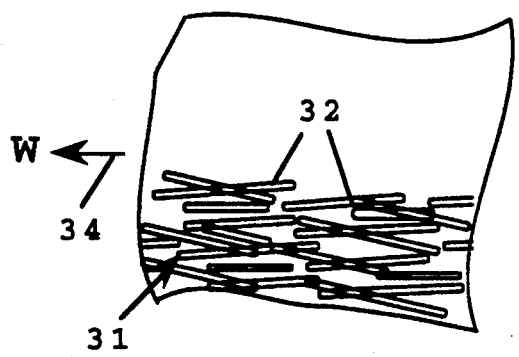
FIGS. 2A and 2B illustrate summit patterns in a texture formed by chemical etching and mechanical abrasion, respectively.
Figure 2A:
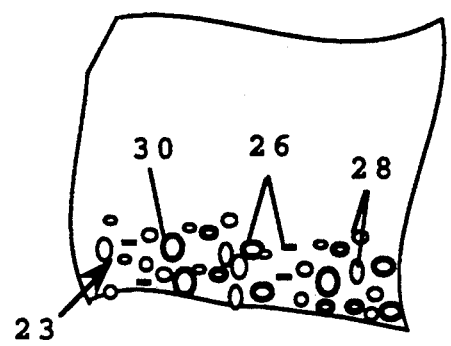

The surface texture features of the substrate are illustrated in FIG. 2A which shows a portion of an isotropic texture 23 having peaks, such as peaks 26 represented by dark circles, and valley, such as valleys 28 represented by light circles. The roughness of the surface is characterized herein by the mean arithmetic roughness, as determined from the equation:

$$R_a = -1/L_m \int_0^{L_m} |z|\, dx,$$

where $L_m$ is the measuring length along the axix x, and z is peak or valley height. In an isotropic texture, such as illustrated in FIG. 2A, the roughness value is substantially the same if measured along any axis in the surface plane.

A summit in the pattern, such as summit 30 in FIG. 2A, is defined as the highest point among 4 adjacent points, such as the four neighboring peaks shown in the pattern. Summit density is then determined from the density of summits within a given $mm^2$ area. Since summit density is determined by the product of the linear density of summits measured along orthogonal axes in the surface plane, the greater the number of summits along each axis, the greater the summit density.

FIG. 2B shows an anisotropic texture 31 formed by standard particle abrasion methods, and illustrates the differences in roughness values and summit density between isotropic and anisotropic textures. The texture in the surface is formed by a series of elongate grooves, such as grooves 32, formed by particle abrasion as a disc is rotated against an abrasive pad in the direction of arrow 34 in the figure. As mentioned above, surface roughness in the FIG. 2B texture is limited by the size of the abrasion particles, and by the abrasion pressure which can be applied to the substrate coating, and summit density is limited by the summit density achievable in the direction of substrate rotation.

The purpose of the selected isotropic surface roughness and summit density in the landing zone region of the substrate is to minimize the static coefficient of friction, or stiction coefficient, of a read-write head on contact with the surface of a thin-film disc during start/stop cycles on the disc. A low static coefficient of friction is important in increasing the start/stop lifetime of a disc, and in reducing the possibility of wear-related damage to the head. Preferably, the roughness and summit density values are selected to yield a coefficient of static friction, as determined by the reactive force in a ten-gram composite or thin-film read/write head placed on a thin-film medium surface, when rotation of the medium is initiated, less than about 2-3 grams.

The relationship between stiction coefficient and surface roughness and summit density is due largely to the total area of contact between the read-write head and recording disc during a start/stop operation. At a low surface roughness, the peaks in the texture will present a relatively large cumulative surface area of contact; this area tends to decrease as the peak-to-valley distance increases and the peaks become more sharply defined. As a rule, the stiction coefficient tends to drop significantly at a average mean roughness value above about 20-70 Å. The surface roughness effect is enhanced, in the present invention, by an isotropic texture, such as shown in FIG. 2A, where the peaks present point-like areas of contact, rather than extended-line, greater-area peaks as in the FIG. 2B texture.

It has also been found that moderately high summit density is important in reducing head/surface contact with the disc, presumably by limiting head contact to summit points only. In general, stiction will be reduced as summit density is increased, up to a summit density of about 500–20,000/mm$^2$, depending on other surface factors such as surface hardness and roughness. As noted above, the substantially isotropic texture of the substrate in the present invention allows a higher summit density per total peak area of contact.

According to another feature of the invention, remaining annular regions of the substrate, corresponding to the recording zone in a thin-film disc, have a substantially smoother surface texture, allowing for closer, near-contact flying height during operation of the disc. Ideally, for high recording density, a flying height of less than 1–3 micro inch (about 25–75 nm), and preferably in the range 0.5–1 (about 13–25 nm) is desired. Preferably, the surface roughness in these outer-diameter regions is less than about 10–50 Å. The summit density is typically less than that of the inner-diameter region.

Figure 3:
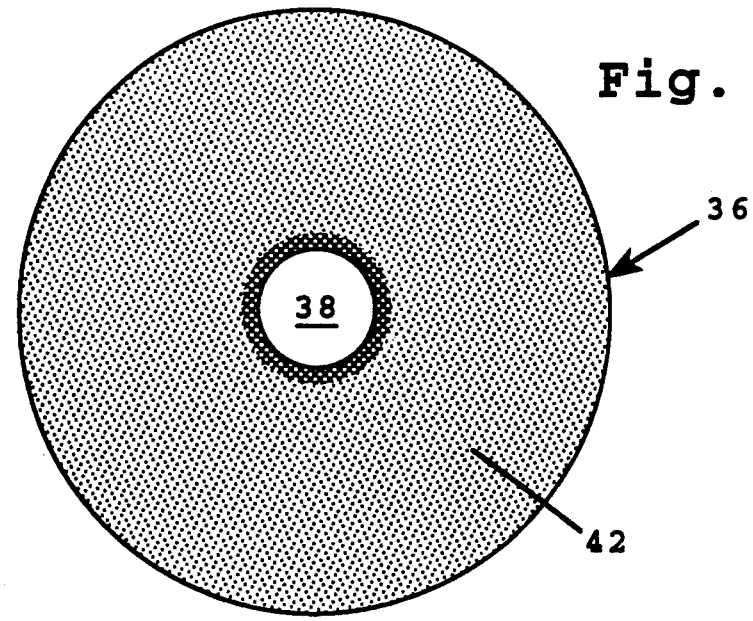
FIG. 3 is a planar view of a thin-film medium substrate, showing inner- and outer-diameter regions having different isotropic texturing, in accordance with the invention.
Figure 4A:
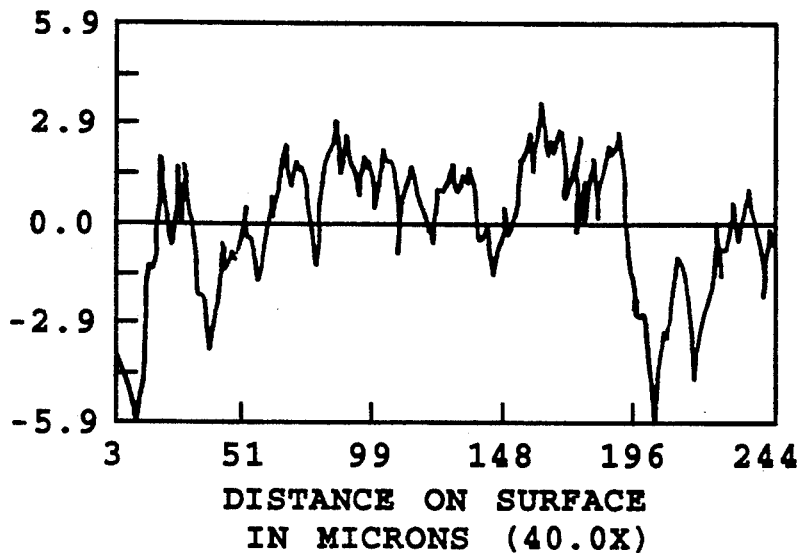
FIGS. 4A-4D are WYKO depth profiles along a segment of coated substrates treated with chemical etching for 5 minutes (4A), 7 minutes (4B), 10 minutes (4C), and 20 minutes (4D)
Figure 4B:
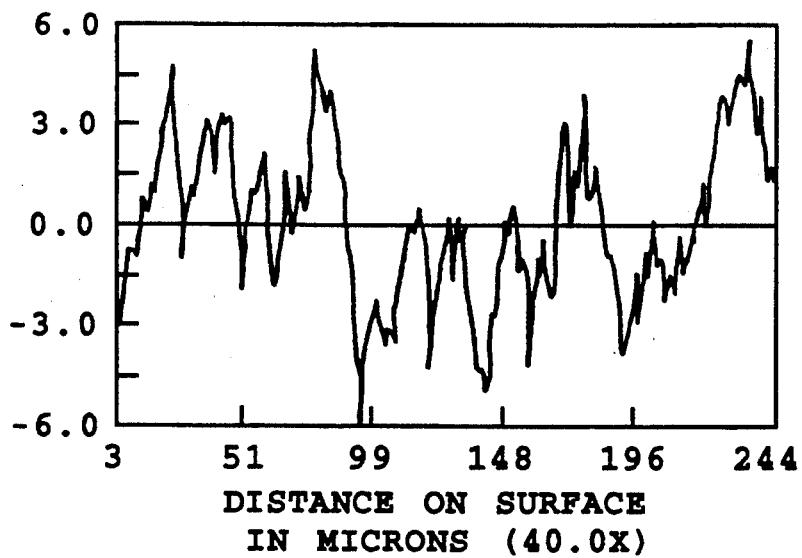
Figure 4C:
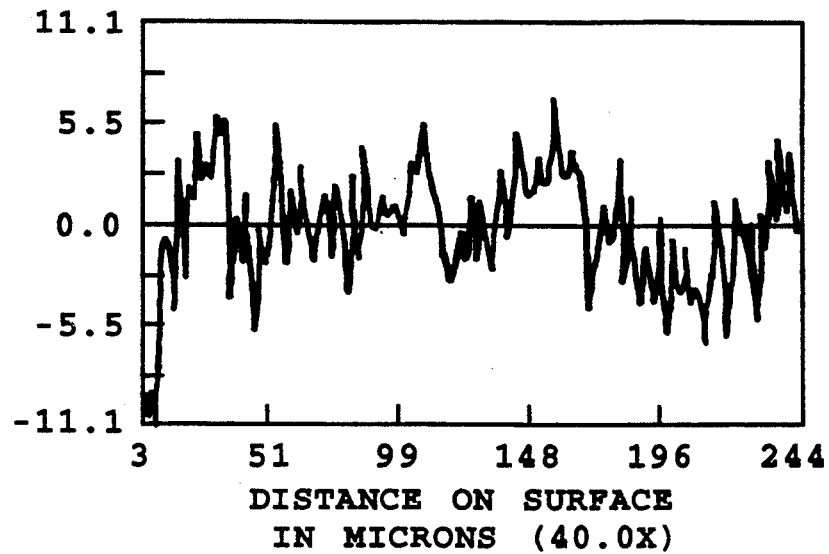
Figure 4D:
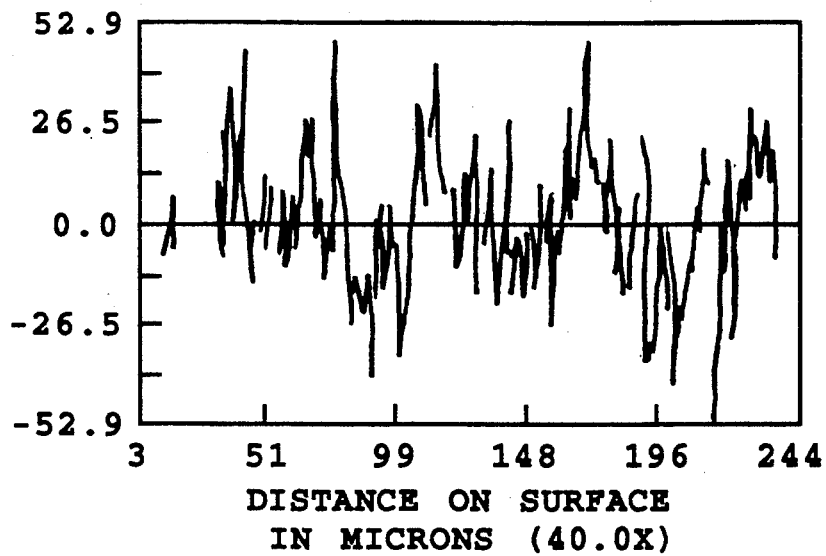
Figure 7A:
FIGS. 7A-7D are scanning electron micrographs (SEMs) of the textured substrate surfaces formed by chemical etching for 5 minutes (7A), 7 minutes (7B), 10 minutes (7C), and 20 minutes (7D)
Figure 7B:
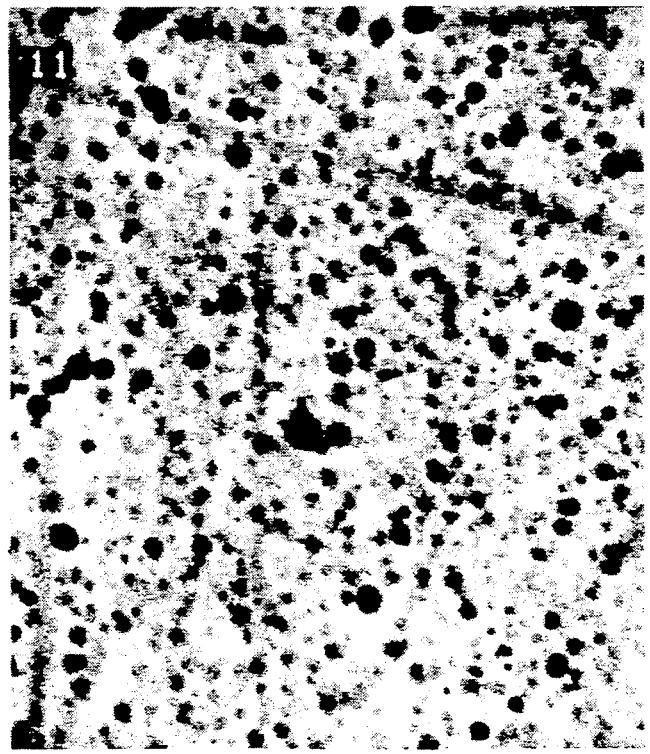
Figure 7C:
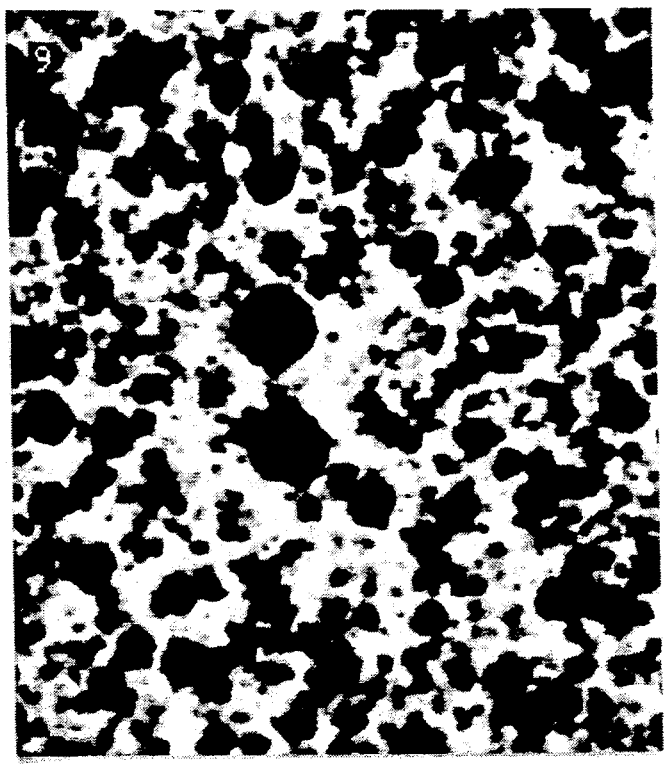
Figure 7D:
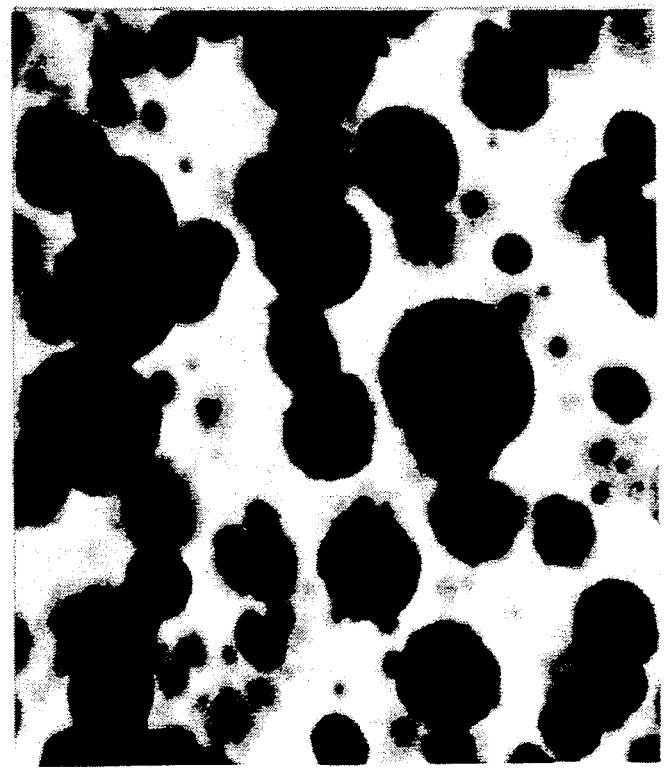

FIG. 3 shows a planar view of a substrate 36 formed in accordance with one embodiment of the invention. As seen, the substrate coating is divided into two annular regions. An inner-diameter annular region 38 corresponds to the clamping and landing zone of a thin-film medium, and typically includes an annulus about 300 mils (thousandths of an inch) in radial thickness and spaced about 300 mils from the inner diameter of a 95 mm disc. The outer-diameter region 42 corresponds to the recording zone in a thin-film medium formed on the substrate.

The inner-diameter region in the FIG. 3 substrate has an isotropic texture with a selected roughness preferably between about 20–70 Å, and a selected summit density between about 1,000–20,000/mm$^2$, and more preferably, between about 6,000–10,000/mm$^2$. The outer-diameter zone has a smoother surface, as indicated by the lighter shading in the outer-diameter region. Exemplary surface roughness values for the outer-diameter zone in the coating are 10 to 50 Å.

B. Texturing Method

In the texturing method of the invention, a substrate having a metal, e.g. nickel-containing, coating is first polished by standard buffing to remove surface irregularities. The polished coating typically has a surface variation, as measured in the direction normal to the surface of less than about 20 Å.

For texturing, the selected annular region in the zone is exposed to a chemical etchant under etchant conditions selected to produce the desired roughness and summit density properties in the region. One preferred etchant for a nickel-phosphorous coating includes nitric acid, 1–10 M, phosphoric acid, 0.1–2 M, and 0.1–1 M $H_2O_2$, as exemplified by the etchant employed in Example 1 containing 7.0 M nitric acid, 1.4 M phosphoric acid, and 0.8 M $H_2O_2$. A variety of other etchants effective to etch a nickel-containing plating, such as HCl, $H_2SO_4$, and $FeCl_3$ may be employed (J. Vossen & W. Kern, "Thin Film Processes," Academic Press (1978), p. 470). Etchants suitable for a variety of metal and metal-alloy materials are known (e.g., Vossen et al).

In the method, the concentration of etchant solute, e.g., acid strength, and the temperature and exposure-time conditions are selected to achieve desired roughness and summit density properties. As a rule, greater roughness can be achieved by greater etchant concentration, higher temperature and/or longer exposure period. Greater summit density can be achieved by lower etchant concentration and/or etching temperature, and longer exposure periods. Thus, for example, to achieve a high roughness, but relatively low summit density, a higher-concentration etchant and/or higher etchant temperature might be employed, with an exposure period sufficient to reach the desired roughness. To achieve a high roughness and high summit density, a relatively lower-concentration etchant and/or lower temperature would be employed, again with an exposure period needed to achieve the desire roughness.

After the etching step, the substrate surface is washed to remove etchant solutes. One preferred wash solution, for use with the nitric-acid solution described above, contains phosphoric acid, 0.3–3 M phosphoric acid and 0.1–2 M $H_2O_2$, as exemplified by the wash solution employed in Example 1 containing 1.6 M phosphoric acid and 1.0 M $H_2O_2$. The substrate is exposed to the washed solution for several minutes, typically at room temperature or slightly greater. After the wash step, the substrate may be rinsed with deionized water and dried under clean nitrogen atmosphere.

FIGS. 4A–4D show surface profiles, taken along a substantially fixed-radius line, of a coated aluminum substrate, after exposure to etchant for 5, 7, 10, and 20 minutes, respectively. The profiles were obtained by phase-shifting interferometry, using a commercially available interferometer to measure surface profiles and calculate a variety of surface characteristics, including arithmetic mean roughness and summit density. One interferometer which is suitable for this purpose is a interferometer, Model TOPO-3D by WYKO Co. (Tuscon, Ariz.).

The arithmetic mean roughness ($R_a$) values calculated from the four profiles are plotted as a function of exposure time in FIG. 5. As seen, little increase was observed over the first 10 minutes of etching, but increased about 12 nm over the next 20 minutes. FIG. 6 shows a similar plot of summit densities ($\times 1,000$/mm$^2$) over the 20-minute exposure period. Most of the change in summit density occurred in the 7–10 minute exposure period. The results indicate that, using the particular etchant solution disclosed in Example 1, high roughness and summit density values in the inner-diameter region can be achieved by exposure to the etchant for 20 minutes or more, and relatively low roughness (and either high or low summit density) can be achieved in the outer-diameter region by exposure to the etchant solution for less than about 10 minutes.

Scanning electron micrographs (SEM) of the four substrates (20,000 magnification) are shown in FIGS. 7A–7D. The grooves seen in the discs etched for 5 minutes (7A) and 7 minutes (7B) are polishing grooves formed in the nickel-phosphorous plating. The dark areas in the SEMs are areas of greater surface depth.

Figure 8:
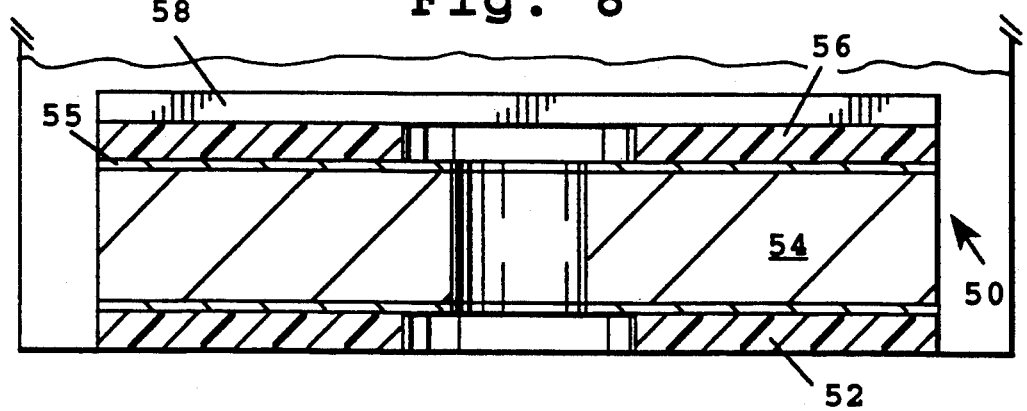
FIG. 8 illustrates one method of producing isotropic texturing in an inner-diameter zone of a substrate, in accordance with the invention.

In practicing the method of the invention, the etching is applied to the selected annular region(s) of the disc under conditions effective to achieve a desired roughness and summit density. In one general method, the substrate coating is masked, during exposure to the etchant, by an annular seal, such as a Teflon ™ seal, which is pressed against outer annular regions of the disc during the etching process. This general method is illustrated in FIG. 8, which shows a etchant chamber 50 having an annular seal 52 mounted in the bottom region. The upper surface of the seal is dimensioned to cover the outer-diameter region of the substrate, leaving an inner-diameter region of the substrate uncovered. With a substrate 54 placed on the seal, the substrate is contacted from its opposite (top) side by a annular second seal 56 carried on a piston element 58 which is effective to compress the substrate between the two seals, as shown.

An etchant solution is then introduced into the chamber to expose the inner-diameter-region of both of the substrate coatings to the etchant solution under selected exposure conditions. After a selected exposure time, the substrate may be transferred to a second vessel in which the entire substrate surface is exposed to the same or a different etching solution, to (a) complete the etching process in the inner-diameter region and (b) achieve a desired roughness and summit density in the remaining, outer-diameter region of the substrate coating.

Alternatively, to achieve a gradient of roughness values, the substrate can be moved through a series of vessels, each having annular seals which protect one less of the outer-diameter subregions than the previous vessel.

Figure 9A:
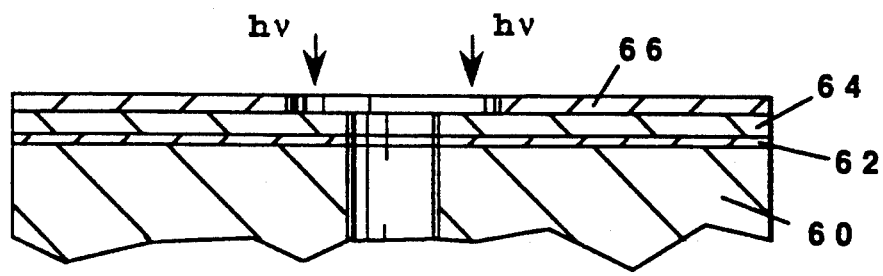
FIGS. 9A-9C illustrate steps in an alternative method for preparing a substrate having an inner-diameter region with a relatively rough isotropic texture and an outer-diameter region with a smoother isotropic texture.
Figure 9B:
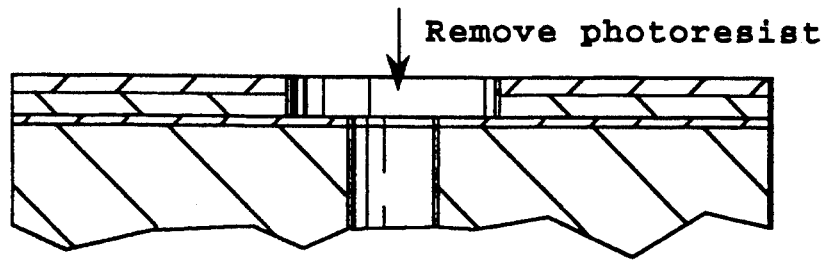
Figure 9C:
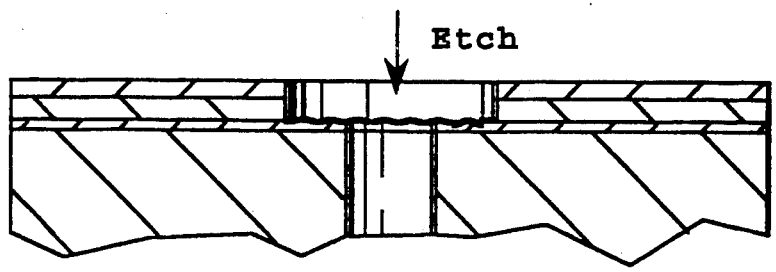

FIGS. 9A–9C illustrate a second general method for carrying out etching in a selected annular region of a substrate, showing one side only of an otherwise symmetrical operation. Here a substrate 60 with a nickel-containing coating 62 is initially covered with a conventional photoresist layer 64, such as used in silicon-chip photolithography techniques (Introduction to Microlithography (Thompson, L. F., et al., eds.) Am Chem Soc, Washington, D.C., 1983). The photoresist layer is exposed to a light-source through a mask 66 which shields the outer-diameter region of the substrate. The surface is then treated to remove the exposed portion of the photoresist, allowing etchant contact with the inner-diameter region of the substrate only.

After a given exposure time, the substrate may be treated to remove the photoresist layer, and the inner- and outer-diameter regions of the surface exposed to the etchant to (a) complete the etching process in the inner-diameter region and (b) achieve a desired roughness and summit density in the remaining, outer-diameter region of the substrate coating.

Alternatively, to achieve a gradient of roughness values, the substrate can be processed to successively remove a wider annulus of the photoresist material, followed by exposure to an etchant solution for a given exposure period.

It will be appreciated from the foregoing how various objects and features of the invention are met. The texturing method provides a simple, readily controlled method for achieving an isotropic texture having selected roughness and summit density characteristics. One annular region, typically the inner-diameter region, can be treated to produce a roughness and summit density which, in a thin-film medium, provides a low stiction coefficient with a read-write head in the landing zone of the medium. One or more other annular regions, typically in an outer-diameter region, can be treated to produce a substantially reduced roughness, to allow near-contact flying height of a read-write head, for high-density recording.

C. Thin-Film Textured Disc

In another aspect, the invention includes a thin-film medium, such as the one shown at 10 in FIG. 1, which includes the textured substrate of the invention. In a preferred embodiment, the medium is formed by successively sputtering onto the textured substrates, underlayer 14, thin-film magnetic layer 16, and carbon overcoat 18. The sputtering is carried out by standard methods (e.g., U.S. Pat. No. 4,816,127).

Briefly, and in one preferred embodiment, the textured substrate is placed in a conventional sputtering apparatus and moved through a succession of sputtering chambers designed for sputtering onto the substrate (a) a chromium underlayer, to a thickness of about 400 to 4,000 Å (b) a thin-film magnetic layer, to a thickness of about 300–1,500 Å, and a hydrogenated carbon overcoat of about 250–600 Å. The thin-film layer is preferably a cobalt-based alloy containing, in one embodiment, 1–10% tantalum, 10–16% chromium, and 60–85% cobalt, and in another embodiment, 2–10% chromium, 20–28% nickel, and 70–88% cobalt. Typically, the discs are coated with a 10–30 Å thick layer of fluorinated lubricant.

The surface roughness of the medium can be examined by interferometry, as described above, and in Example 1. Experiments conducted in support of the present invention show that the surface characteristics of the thin-film medium closely reflect that of the substrate coating produced by the method of the invention. That is, the sputtering steps substantially preserve the surface texture roughness values and summit density of the textured substrate.

As noted above, the roughness and summit density in the inner-diameter region of the substrate are selected to reduce the stiction coefficient for read-write head contact in the landing zone of a thin-film disc formed on the substrate. This coefficient can be measured, in the thin-film medium, by standard methods. One preferred method employs a "Dysan" tester for measuring the stiction and friction coefficient of a disc. Briefly, the device includes a motor-driven rotor for rotating the disc at a low speed, typically about 1 rpm. A standard 9.5-gram mini-composite or thin-film read/write head can be switched between a contact position and a noncontact or unloaded position with respect to the disc. This head, in turn, is coupled to a force transducer which measures the force (in the circumferential direction) applied to the head upon rotation of the disc. By repeating the start/stop contact over several thousand cycles, the effect of repeated contact on the stiction coefficient of the medium can be determined.

Figure 10:
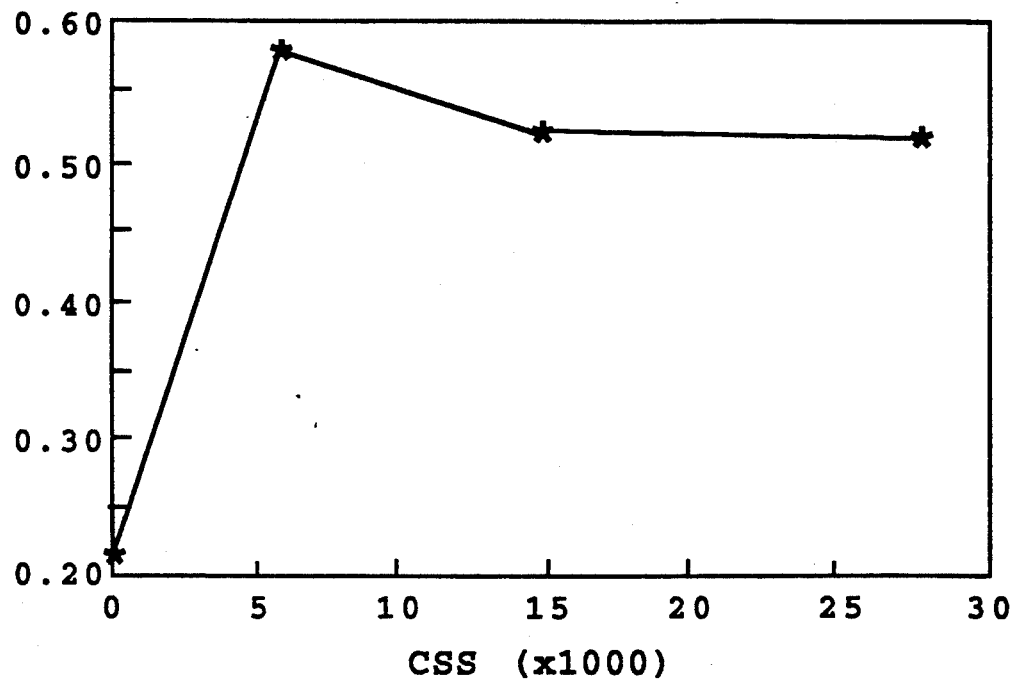
FIG. 10 shows the change in stiction coefficient as a function of contact start/stop cycles in a thin-film medium formed in accordance with the invention.

FIG. 10 plots the effect of contact start/stop (CSS) cycles on the stiction coefficient of a thin-film medium prepared in accordance with the invention. Briefly, a coated aluminum substrate was etched, in its inner-diameter region, to produce a surface having an Ra of about 35 Å and a summit density of about 8,400/mm$^2$. The medium was sputtered with a chromium underlayer, a thin-film magnetic layer, and a hydrogenated carbon overcoat. The disc was coated with an 18 Å lube coat. Wyko interferometry measurements of the disc surface showed substantially the same Ra and summit density values as measured in the etched substrate.

The disc surface was tested in a disc drive by using a 9.5 gm load of a thin-film head for contact start/stop (CSS). As seen in FIG. 10, the coefficient of friction increases from about 0.2 to nearly 0.6 over the first 6,000 CSS, then stabilizes at about 0.52 from up to 28,000 CSS. There was no apparent wear after 28,000 CSS.

The following example illustrates a method for texturing a plated substrate, according to methods of the invention. The example is intended to illustrate, but not limit the scope of the invention.

EXAMPLE 1

Textured Substrate with Selected Roughness

Aluminum substrate obtained from Kobe Precession (California) was coated with nickel-phosphorous film to a final film thickness of 400 micro-inch using an electroless nickel bath supplied by UIC, Japan.

The coating was polished by using alumina slurry in two steps. The substrate coating was placed in an etching solution containing $HNO_3$ (7.0 M), $H_3PO_4$ (1.4 M), $H_2O_2$ (0.8 M) in deionized water, and maintained at about 30° C. After 5, 7, 10, or 30 minutes exposure time, the substrate was removed and submerged in a washing solution containing $H_3PO_4$ (1.6 M) and $H_2O_2$ (1.0 M) in deionized water. The washing step was carried out at 30° C. for 2-10 minutes. The substrates were washed with deionized water and dried under clean nitrogen atmosphere.

The depth and density of nm-range irregularities in the disc surfaces were determined by interferometry, using a WYKO interferometer TOPO-3D. The summit density was measured at 8 Å threshold. FIGS. 4A-4D show measured surface profiles, over a 244 micron length, in coatings formed by etching at 5, 7, 10, and 20 minutes, respectively. The interferometer includes software which calculates arithmetic mean roughness value $R_a$, mean peak height above a mean line $R_p$, mean peak-to-valley height $R_z$, and summit density. The roughness $R_a$ and summit density values determined for the four substrates are plotted in FIGS. 5 and 6, as discussed above.

Although preferred embodiments of the invention have been described, it will be apparent to those skilled in the art that various changes and modifications may be made without departing from the invention.

It is claimed:

1. A method of texturing a polished, metal, annular-surface coating on a thin-film medium substrate, to produce a substantially isotropic texture with a selected roughness and summit density in a selected annular zone of the coating, comprising
    exposing such annular zone to an acidic chemical etchant effective to etch the surface coating, for an exposure period sufficient to produce such roughness and summit density,
    during at least a portion of such exposing, masking other annular zones of the coating from contact with the etchant, producing a lesser roughness and summit density in such other zones, and
    removing such etchant from the coating.

2. The method of claim 1, wherein said coating contains between 86 and 93 atom percent nickel and 7 and 14 atom percent phosphorus, and said etchant contains 1-10 M nitric acid, 0.1-2 M phosphoric acid, and 0.1-1 M $H_2O_2$.

3. The method of claim 2, wherein said removing includes contacting the etching coating with a solution containing 0.3-3 M phosphoric acid and 0.1-2 M $H_2O_2$.

4. The method of claim 1, wherein the selected annular zone includes an annular inner diameter region of said coating corresponding substantially to the landing zone of a read-write head in a thin-film medium, said other zones include the annular outer-diameter region of the coating outside the inner diameter region, and said masking includes placing an annular seal against such outer annular region.

5. The method of claim 4, wherein said outer annular region is exposed to such etchant for a period sufficient to produce a selected roughness and summit density which is less than that of the inner diameter region.

6. The method of claim 1, wherein said exposing includes forming a photoresist layer on said coating, exposing the photoresist layer in such selected annular zone, removing the exposed portion of the photoresist layer, and contacting the coated substrate with such etchant.

7. The method of claim 1, wherein said exposing is effective to produce an isotropic summit density of between about 500-20,000/mm$^2$ and an arithmetic mean roughness value between about 20-70 Å.

8. The method of claim 7, wherein said exposing is effective to produce an isotropic summit density of between about 6,000-10,000/mm$^2$.

9. A method of texturing a polished metal annular-surface coating on a thin-film medium substrate, to produce a first substantially isotropic texture with a selected roughness and summit density, in an annular inner diameter region of the coating corresponding substantially to the landing zone of a read-write head in a thin-film medium, and a second substantially isotropic texture with a roughness and summit density which are substantially less than that of the selected summit density, in an annular outer diameter region of the coating, for use in preparing a thin-film medium for operation at a flying height of less than about 1 micro-inch, comprising
    exposing such annular inner-diameter zone to a chemical etchant effective to etch such coating, for an exposure period sufficient to produce such selected texture having a summit density between about 500-20,000/mm$^2$, and an arithmetic mean roughness value between about 20 and 70 Å,
    exposing such annular outer diameter zone to a chemical etchant effective to etch such coating, for an exposure period sufficient to produce such second texture having an arithmetic roughness value between about 10 and 50 Å, and
    removing such etchant from the coating.

10. The method of claim 9, wherein said coating contains between 86 and 93 atom percent nickel and 7 and 14 atom percent phosphorus, and said etchant contains 1-10 M nitric acid, 0.1-2 M phosphoric acid, and 0.1-1 M $H_2O_2$.

11. The method of claim 10, wherein said removing includes contacting the etching coating with a solution containing 0.3-3 M phosphoric acid and 0.1-2 M $H_2O_2$.

12. The method of claim 10, wherein the second exposing step is carried out during a portion of the first exposing step, employing a common chemical etchant for both steps, and masking said annular outer-diameter zone during a portion of the period of etchant exposure to the annular inner-diameter zone.

13. A substrate for use in a thin-film magnetic medium, comprising
    a annular support, and
    an annular metal coating formed on the support, and characterized by a substantially isotropic texture with a selected roughness and summit density in a selected annular zone of the coating which includes the landing zone of a read-write head in a thin-film medium, and a lesser roughness in a region of the disc outside the selected annular zone.

14. The substrate of claim 13, wherein said annular inner-diameter region has a summit density between about 500–20,000/mm² and an arithmetic mean roughness between about 20–70 Å.

15. The substrate of claim 14, wherein said annular outer-diameter region has an arithmetic mean roughness of between about 10 and 50 521 .

16. The substrate of claim 13, wherein the annular, outer-diameter region of the coating which lies outside the annular inner-diameter region is characterized by a substantially isotropic texture having a summit density between about 500–20,000/mm².

17. The substrate of claim 13, which further includes, layered in succession over said coating, a chromium underlayer, a magnetic thin-film layer, and a carbon overcoat, forming a thin film medium with a surface roughness less than about 0.5 μinch.

* * * * *